US005587078A

United States Patent [19]

LeBlanc

[11] Patent Number: 5,587,078

[45] Date of Patent: Dec. 24, 1996

[54] CENTRIFUGAL CLEANER

[75] Inventor: Peter LeBlanc, Queensbury, N.Y.

[73] Assignee: Ahlstrom Machinery Corporation, Noormarkku, Finland

[21] Appl. No.: 221,004

[22] Filed: Apr. 1, 1994

[51] Int. Cl.[6] ........ B01D 21/26

[52] U.S. Cl. ........ 210/512.1; 210/787; 55/459.1; 55/459.5; 209/717; 209/718; 209/721; 209/732; 209/734

[58] Field of Search ........ 55/459.1, 459.2, 55/459.3, 459.4; 209/715, 717, 718, 719, 721, 723, 725, 732, 734; 210/512.1, 787

[56] References Cited

U.S. PATENT DOCUMENTS

| | | | |
|---|---|---|---|
| 2,756,878 | 7/1956 | Herkenhoff . | |
| 2,793,748 | 5/1957 | Herkenhoff . | |
| 2,816,658 | 12/1957 | Braun et al. . | |
| 2,975,896 | 3/1961 | Hirsch . | |
| 3,306,461 | 2/1967 | Weis . | |
| 3,349,548 | 10/1967 | Boyen . | |
| 3,439,810 | 4/1969 | Newman et al. | 209/732 |
| 3,807,142 | 4/1974 | Rich et al. . | |
| 3,850,816 | 11/1974 | Koch | 209/718 |
| 3,959,150 | 5/1976 | Frykhult et al. . | |
| 4,155,839 | 5/1979 | Seifert et al. . | |
| 4,344,538 | 8/1982 | Fujisawa et al. | 209/717 |
| 4,581,142 | 4/1986 | Fladby et al. . | |
| 5,240,115 | 8/1993 | Crossley et al. | 209/732 |

FOREIGN PATENT DOCUMENTS

| | | |
|---|---|---|
| 1526836 | 7/1987 | U.S.S.R. . |
| WO94/11109 | 5/1994 | WIPO . |

*Primary Examiner*—David A. Reifsnyder
*Attorney, Agent, or Firm*—Nixon & Vanderhye P.C.

[57] ABSTRACT

A centrifugal cleaner is constructed so that its efficiency is less sensitive to consistency changes of the feed slurry, and so that it can operate at a higher consistency than conventional cleaners, yet optimizes separation efficiency. This is accomplished by disposing a turbulence generator in the tangential inlet to the cleaner, the turbulence generator comprising an abrupt cross-sectional area reduction (e.g. a cross-sectional area of about 0.1–0.3 times as large as the cross-sectional area of the inlet) so as to break up fiber flocs and prevent reformation of the flocs. Existing centrifugal cleaners can easily be retrofit by the method of the invention to achieve the invention's advantages by inserting a turbulence generator into the inlet of an existing centrifugal cleaner. The tangential inlet leads to a hollow main body which includes a vortex finder located in the body top. Preferably the vortex finder has a first diameter and the hollow body has a second diameter at a portion surrounding the vortex finder, the first diameter being about 0.25–0.4 times the second diameter. The vortex finder typically extends into the hollow body a first length from the top, the first length to first diameter ratio being about 2.5–3.5/1.

26 Claims, 13 Drawing Sheets

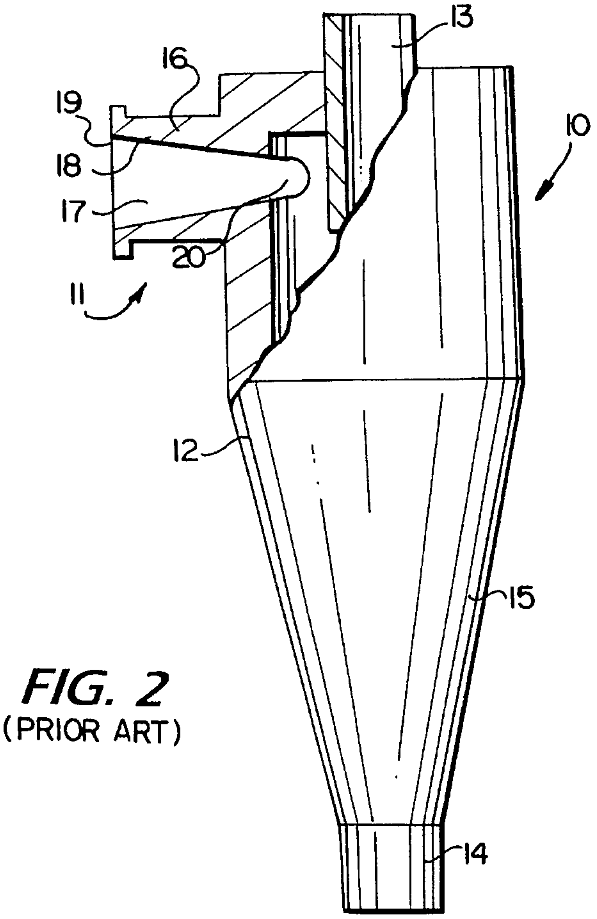
FIG. 2
(PRIOR ART)
FIG. 3
(PRIOR ART)
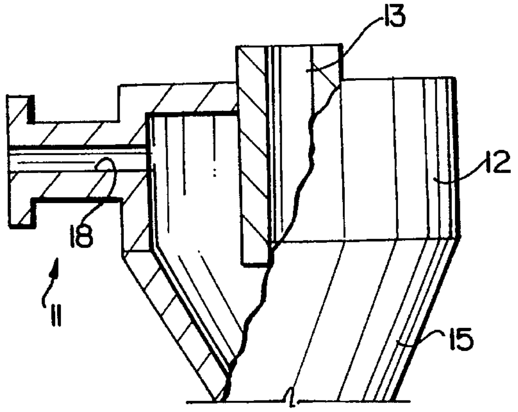
FIG. 5
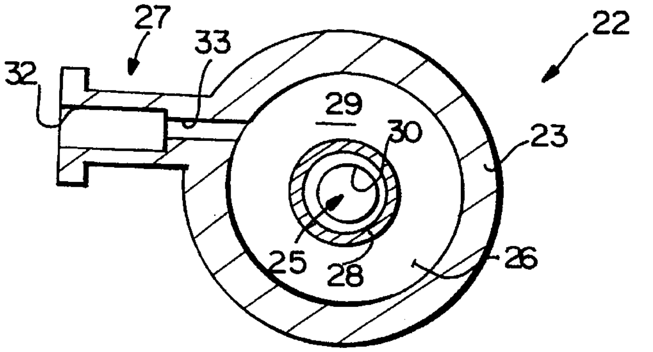

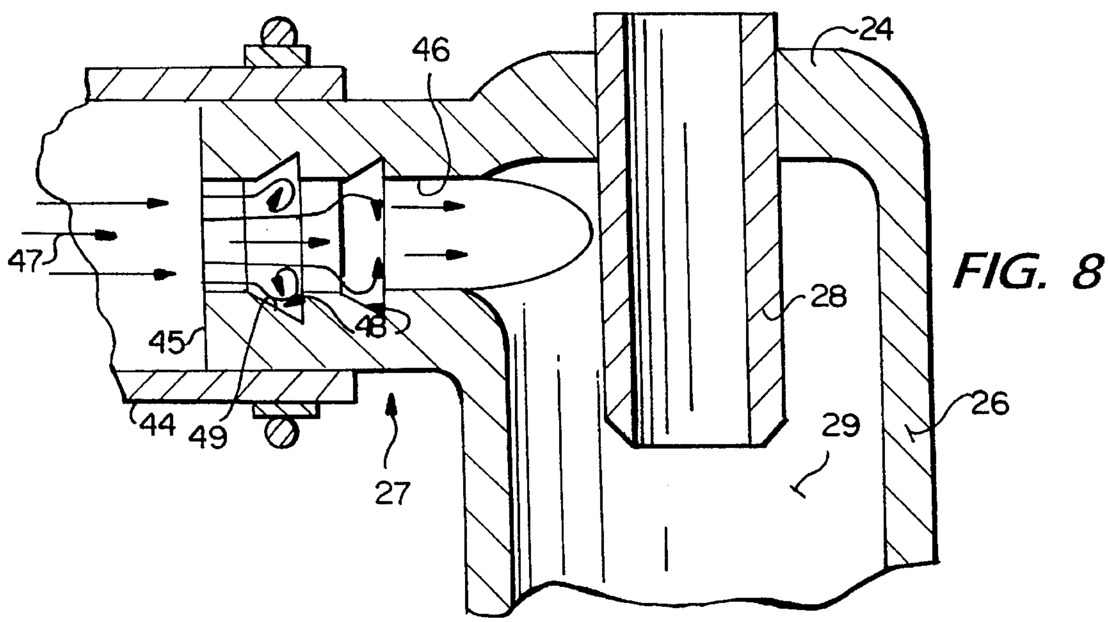
FIG. 8
FIG. 9
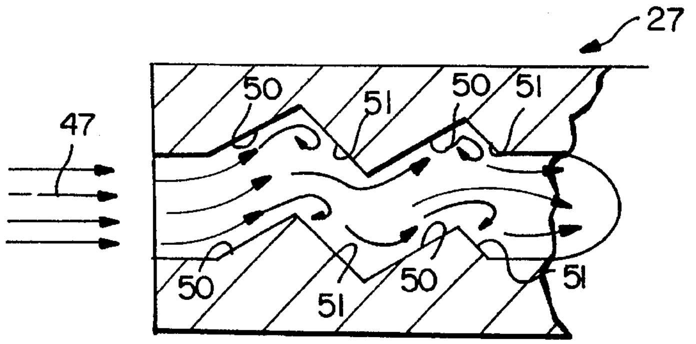
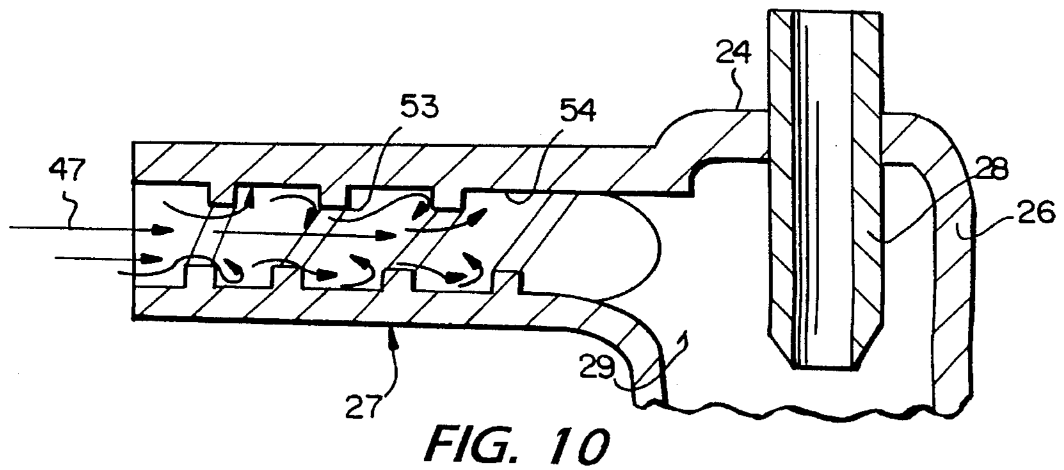
FIG. 10

FIG. 14
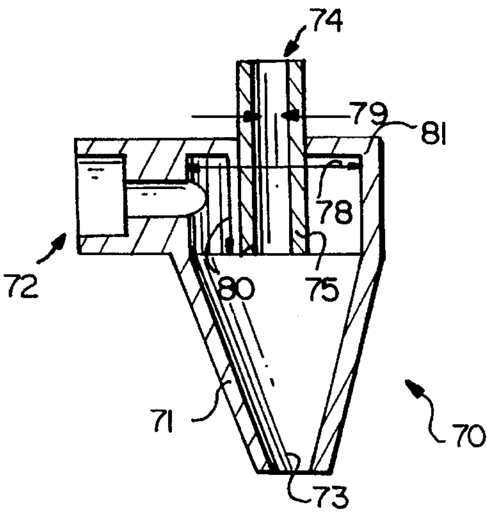
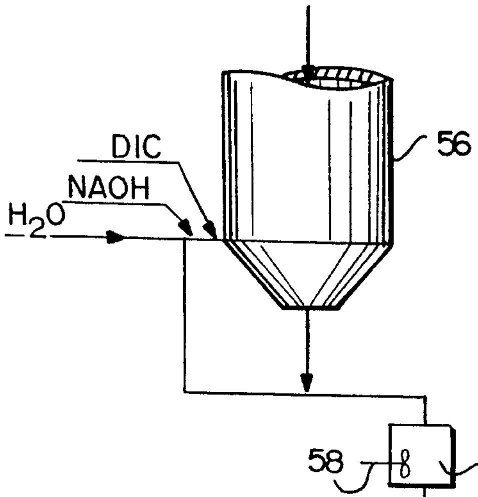
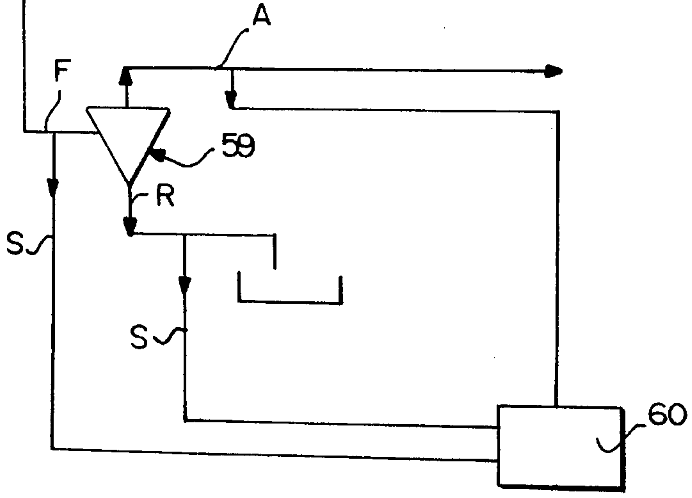
FIG. 11

CENTRIFUGAL CLEANER

BACKGROUND AND SUMMARY OF THE INVENTION

Centrifugal cleaners have been known for decades. In a typical use of a centrifugal cleaner it is desirable to remove as many contaminants (rejects, debris) as possible while removing as little desirable material (accepts) as possible, i.e. to have the highest practical cleaning efficiency. Many different to structures and implementation schemes have been designed to accomplish this desirable end result, however conventional cleaners still are not as effective as desired for many applications. For example, in the pulp and paper industry the consistency of the fiber suspension to be treated tends to vary for a number of reasons, and there is a continuing desire to use higher consistency suspensions to decrease the amount of water used for diluting the pulp for centrifugal cleaning. It has, however, been found that the cleaning efficiency of conventional centrifugal cleaners is extremely sensitive to consistency, and if the consistency of the fiber suspension increases the efficiency of the cleaner drops dramatically. This is believed due at least in part to the fact that the cleaner recognizes pulp flocs (which naturally have a higher specific gravity than individual fibers) as knots or stickies, and therefore treats them as rejects. The amount and/or size of pulp flocs tends to increase with increasing suspension consistency.

In pulp and paper making, environmental demands necessitate recycling of paper. The paper, depending on its origin, contains more or less fillers, ink, etc. i.e. matter that should be removed as efficiently as possible. Centrifugal cleaners have been used for removing this undesired matter with some success. However, it has been found that ink particles, especially originating from laser printers, are extremely difficult to remove, but as the demand for offices to recycle wastepaper grows the amount of recycled paper containing laser ink increases rapidly.

According to the present invention, a number of improvements are provided to conventional centrifugal cleaners which remarkably improve their efficiency and/or versatility, which improvements can be incorporated in new cleaners or retrofit into existing cleaners.

Virtually all centrifugal cleaners have a generally hollow main body with a side wall having a cylindrical body portion and a generally decreasing conical body portion tapering from the top toward the bottom, a tangential inlet nozzle in the side wall near the body top in the cylindrical body portion for introducing fluid material to be cleaned, a top outlet nozzle (commonly known as a "vortex finder ") extending downwardly into the body through the top and centrally located in the body, the bottom of the top nozzle extending below the tangential inlet nozzle, and a bottom outlet nozzle disposed generally concentrically with the top outlet nozzle, and spaced from the tangential inlet nozzle. The improvements according to the invention relate to the configuration of one or all of the tangential inlet nozzle, the cylindrical body portion and the vortex finder.

A typical tangential inlet nozzle is of conically tapering configuration in the fluid flow direction. For example see U.S. Pat. Nos. 2,756,878, 2,793,748, 2,816,658, 3,306,461, 3,349,548 and 3,807,42. It has been found according to the present invention that a tapering configuration is far from ideal, causing minimal turbulence, which means in practice that even small variations in the consistency of the fluid have a dramatic effect on the efficiency of the centrifugal cleaner. Existing centrifugal cleaners have high removal efficiencies at 0.5–0.6% feed consistency, but efficiency drops significantly as consistency increases. A centrifugal cleaner that efficiently removes unwanted particles (rejects) from pulp at consistencies of 1.0% or higher has a number of advantages, including allowing utilization of a less costly deinking system, and requiring only about one-half of the water consumption (or treatment) of a conventional low consistency (0.5–0.6%) system.

The increase in the consistency of a fiber suspension means in practice that the fibers are closer to each other and, therefore, form flocs i.e. groups of fibers, more easily. Since the fiber flocs decrease the efficiency of the cleaner the formation of flocs should be prevented. According to the present invention, an inlet nozzle having turbulence generating capabilities is provided. A turbulence generator prevents an increase in suspension consistency from decreasing the efficiency of the cleaner by preventing the flocs from forming in the nozzle and/or by breaking up already formed flocs.

According to one aspect of the present invention a centrifugal cleaner for fiber suspensions having fiber flocs therein is provided. The cleaner comprises the following elements: A generally hollow main body having a top and a bottom and a side wall having at least a portion thereof with a generally decreasing conical taper from the top toward the bottom thereof, and having a tangential inlet in the side wall near the body top for introducing fiber suspension to be cleaned. [In the specification and claims the terms "top" and "bottom" are used for reference purposes only, and do not require any particular orientation. While usually the "top" is directly vertically above the "bottom", the "top" and "bottom" may be horizontally in line or the "bottom" above the "top", or a wide variety of other orientations may be provided.]A vortex finder located in the body top. A bottom outlet nozzle located at the bottom of the main body, substantially concentric with the vortex finder. And, a turbulence generator disposed in the tangential inlet for generating sufficient turbulence so as to break up fiber flocs in introduced suspension and prevent reformation of the flocs before the suspension enters the hollow main body, so as to enhance cleaning efficiency of the cleaner, increase the consistency of fiber suspension which the cleaner can effectively handle, and/or minimize the sensitivity of the cleaner cleaning efficiency to consistency changes in the fiber suspension compared to the same cleaner but not including the turbulence generator.

The turbulence generator preferably comprises an abrupt cross-sectional area reduction portion in the tangential inlet; e.g. the turbulence generator portion has a cross-sectional area of about 0.1–0.3 times as large as the cross-sectional area of the inlet. Where the inlet is substantially circular in cross-section having a first diameter, the turbulence generator reduced cross-sectional area portion has a second diameter which is about 0.35–0.55 (preferably 0.4–0.5, e.g. 0.46) times as large as the first diameter.

Alternatively the turbulence generator may comprise a plurality of surface manifestations in the inlet causing a fluctuating cross-sectional area within the inlet from near the beginning of the inlet to the hollow main body. The surface manifestations may comprise a plurality of circumferential grooves which are polygonal in cross-section, or a spiral rib having a height of about 15–25% of the diameter of the inlet, or comparable surface manifestations. Alternatively the turbulence generator may comprise a zig-zag configuration of the inlet which causes the fiber suspension to flow in a tortious path.

The invention also relates to a method of reconstructing a conventional centrifugal cleaner, that is retrofitting the conventional cleaner so as to achieve the advantages according to the invention. The method is practiced by the step of inserting into the inlet a turbulence generator and positioning the turbulence generator within the inlet. For example this may be accomplished by inserting into the inlet a turbulence generator having an exterior cross-sectional area and configuration corresponding to the first cross-sectional area and configuration and an interior second cross-sectional area about 0.1–0.3 times the first cross-sectional area, and having a second length significantly less than the first length; and positioning the turbulence generator in the inlet so that there is an abrupt cross-sectional area decrease in the pathway of fibrous suspension flowing into the inlet and to the body. This also may be effectively, or alternatively, practiced by inserting into the inlet a turbulence generator having an exterior cross-sectional area and configuration corresponding to the first cross-sectional area and configuration, and an interior passage for generating sufficient turbulence so as to break up fiber flocs in introduced fiber suspension and prevent reformation of the flocs before the suspension enters the hollow main body, so as to enhance cleaning efficiency, increase the consistency of fiber suspensions the cleaner can effectively handle, and/or mininimize the sensitivity of the cleaner to consistency changes in the fiber suspension compared to the same cleaner but not including the turbulence generator.

According to another aspect of the present invention, cleaning efficiency is enhanced even further by providing a particular ratio of the vortex finder diameter to the cleaner body diameter, and by providing a particular length of the vortex finder into the cleaner body, a length significantly longer than is typically utilized. Surprisingly a longer vortex finder does not necessarily result in enhanced short circuit prevention of introduced pulp to the accepts outlet, but it does have a significant positive affect on debris removal efficiency. The particular construction of the vortex finder according to the present invention can be used in combination with a turbulence generator as set forth above, or independently.

According to this aspect of the present invention, a centrifugal cleaner for fiber suspensions is provided which comprises the following elements: A generally hollow main body having a top and a bottom and a side wall having at least a portion thereof with a generally decreasing conical taper from the top toward the bottom thereof, and having a tangential inlet in the side wall near the body top for introducing fiber suspension to be cleaned. A vortex finder located in the body top. A bottom outlet nozzle located at the bottom of the main body, substantially concentric with the vortex finder. Wherein the vortex finder has a first diameter and the hollow body has a second diameter at a portion thereof surrounding the vortex finder. And, wherein the first diameter is about 0.25–0.4 times the second diameter.

The vortex finder extends into the hollow body a first length from the top, the first length to first diameter ratio being about 2.5–3.5/1. The first diameter is most preferably about 0.3–0.5 times the second diameter, while the first length the first diameter ratio is preferably about 2.5–3.1/1.

Also, it has been found that cleaning efficiency is enhanced when, in conjunction with the longer vortex finder described above any cylindrical portion of the generally hollow main body is minimized or eliminated. For example excellent efficiency is obtained when the side wall from the tangential inlet toward the bottom is substantially completely defined by the conically tapered portion, and wherein the conically tapered portion has an angle of taper of about 2°–6°.

The advantages of this aspect of the present invention may also be achieved by reconstructing (retrofitting) existing cleaners. For example where a cleaner body has a first diameter and the vortex finder has a first length from the top of the cleaner into the body, there may be the step of replacing the vortex finder with a replacement vortex finder having a second length greater than the first length, and a second diameter, the ratio of the second length to the second diameter being about 2.5–3.1/1. The replacing step may also or alternatively be practiced by replacing the vortex finder with a replacement vortex finder having a second length greater than the first length and a second diameter, the second diameter being about 0.3–0.35 times the first diameter.

It has also been found according to the present invention that a smaller retention time in the centrifugal cleaner for the pulp actually results in better cleaning efficiency. While the retention time differs significantly depending upon the size of conventional cleaners, retention times typically range from about 0.55–1.95 seconds. In general smaller diameter cleaners have shorter retention times and larger cleaners have longer retention times. Once a particle is moved to the cleaner wall or outside diameter it can be assumed to be removed. Accepts are skimmed off near the core and since the debris particles have been forced to the cleaner walls the core pulp is clean. In the worst case scenario a particle has to migrate from the central "air" core to the cleaner wall, this distance roughly being equal to the cleaner's radius. In a conventional three inch cleaner this distance is 1.5 inches while in a 12 inch cleaner the distance is six inches. Assuming there is a reasonable settling rate of particles at three inches per second, a three inch cleaner needs 0.5 seconds to remove the particle while a 12 inch cleaner needs two seconds. Providing no cylindrical portion of the cleaner body, but merely the conical taper, reduces the cleaner volume and thus the retention time, with an optimum retention time of less than about 0.5 seconds being optimum for a three inch cleaner.

It is the primary object of the present invention to provide a centrifugal cleaner having enhanced cleaning efficiency, the ability to efficiently clean fiber suspensions of significantly higher consistency than in the prior art, and/or to provide a cleaner less susceptible or sensitive to consistency changes in the fiber suspension. This and other objects of the invention will become clear from an inspection of the detailed description of the invention and from the appended claims.

BRIEF DESCRIPTION OF THE DRAWINGS

FIG. 2 is a side view, partly in cross-section and partly in elevation, of a conventional centrifugal cleaner such as used to generate the graph of FIG. 1;

FIG. 3 is a view like that of FIG. 2 for another type of conventional centrifugal cleaner;

FIG. 5 is a longitudinal cross-sectional view, taken along lines 5—5 of FIG. 4, of the exemplary cleaner according to the invention of FIG. 4;

FIG. 8 is a view like that of FIG. 4 showing yet another exemplary configuration of turbulence generator;

FIG. 9 is a detail longitudinal cross-sectional view of still another exemplary configuration of turbulence generator that can be used according to the present invention;

FIG. 10 is a view like that of FIG. 8 showing still another alternative construction of turbulence generator according to the invention;

FIG. 11 is a schematic illustration of exemplary laboratory test equipment that may be used in testing the efficiency, etc., of centrifugal cleaners according to the present invention;

FIG. 14 is a view like that of FIG. 12 only showing an exemplary cleaner according to the present invention with an elongated vortex finder and essentially an entirely conical body;

DETAILED DESCRIPTION OF THE DRAWINGS

Figure 1:
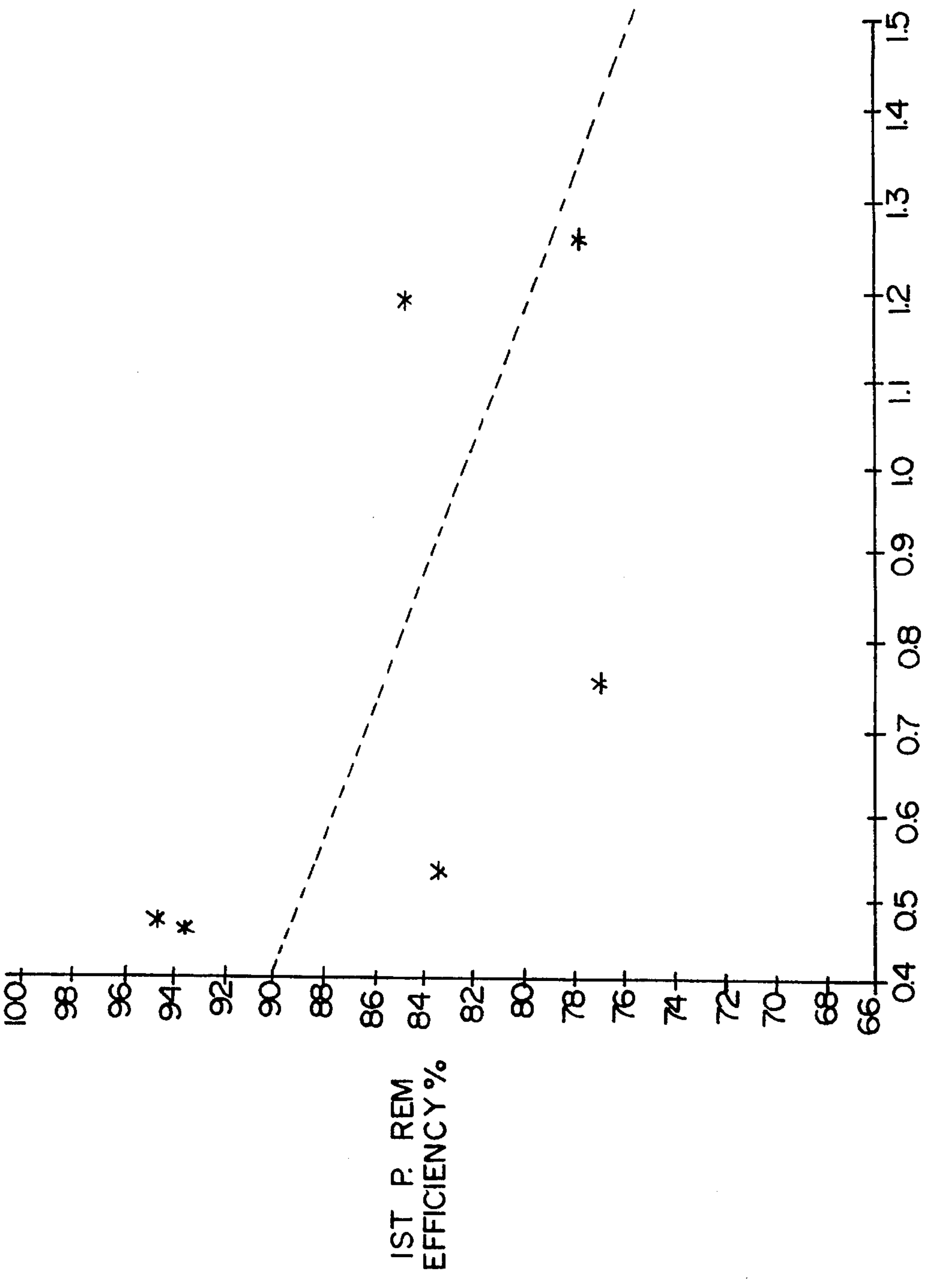
FIG. 1 (PRIOR ART)
FIG. 1 is a graphical representation showing the relationship of cleaning efficiency to pulp consistency for a conventional three inch diameter centrifugal cleaner.

The effect of increasing cleaning consistency, in the prior art, on the removal efficiency of densified inks is shown in FIG. 1, as an example only. Using a typical centrifugal cleaner—such as schematically illustrated in FIG. 2—the highest ink removal efficiencies are obtained at consistencies significantly less than 1.0%. In mill applications, however, many cleaning systems are operating at consistencies of 1.0% or above. The result is less than optimum ink (or other particle) removal efficiency. For instance, the separation/cleaning efficiency of an ordinary cleaner at a conventional consistency of 0.5% is about 89%. If the consistency is raised to 1.0% the efficiency decreases to about 82% which is oftentimes considered to be below acceptable limits. The pulp and paper industry has set high demands for separation efficiency and machine manufacturers have been struggling for years to improve their cleaners to meet these demands. Conventional centrifugal cleaners have an excessive use of water due to low operating consistency. If the consistency could be doubled, or even tripled, the water consumption would drop drastically to one half or one third, respectively, at the particular consistency ranges that centrifugal cleaners operate at.

An exemplary centrifugal cleaner according to the prior art is shown generally by reference numeral 10 in FIG. 2. Major components include the tangential inlet nozzle 11 to a generally hollow main body 12, an accepts outlet defined by an axial top outlet nozzle (vortex finder) 13 extending inside the hollow body (e.g. perhaps covering the entire length of the cylindrical part of the main body 12), and an axial rejects outlet 14 at the bottom of the cleaner 10. The body has a side wall 15 at least a portion of which has a conical tapering towards the outlet nozzle 13 (e.g. 2°–6°). The main body 12 has most often a cylindrical body portion into which the tangential inlet nozzle 11 opens and a conical body portion therebelow, as seen in FIG. 2. In other words, the main body 12 may be formed of either two portions; cylindrical and conical, or only one conical portion. Also there are some other types of cleaners having different configuration but the shape and location of the inlet nozzle is most often the one shown in FIG. 2. Thus the conventional tangential inlet nozzle 11 is defined by a pipe 16 having an interior 17 defined by a tapered wall (the wall may also be cylindrical) from the end 19 most remote from the body 12, to an end 20 closest to the body 12, this construction being known as a "velocity head" cleaner.

FIG. 3 illustrates another conventional cleaner known as a "standard head" cleaner. In this cleaner components comparable to those in FIG. 2 are shown by the same reference numeral. The most significant difference between the standard head cleaner of FIG. 3 and the velocity head cleaner of FIG. 2 is that the inlet nozzle 11 interior wall 18 has a substantially constant diameter.

Figure 4:
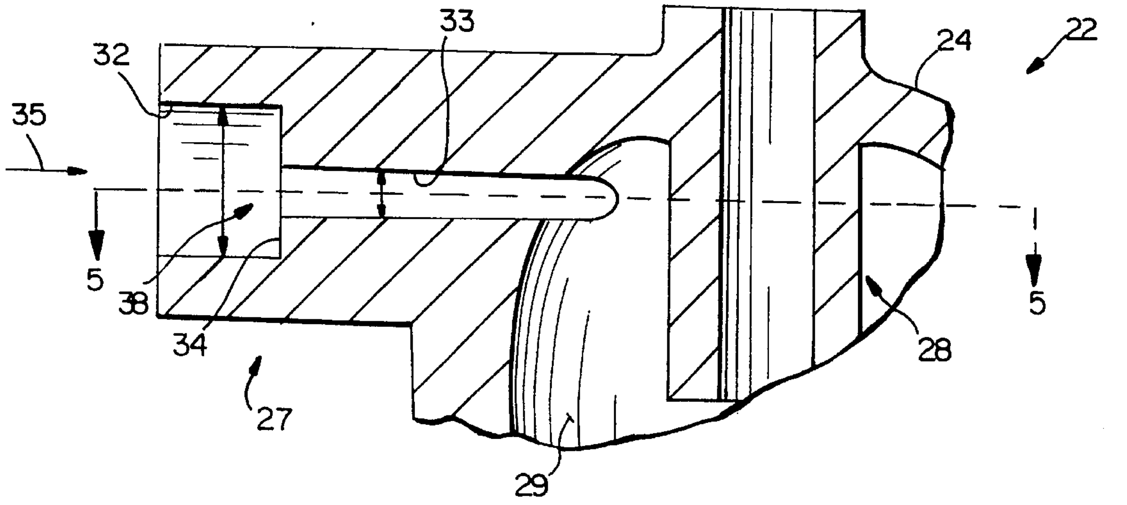
FIG. 4 is a detail side cross-sectional view showing an exemplary tangential inlet with turbulence generator, and extended length vortex finder, of a centrifugal cleaner according to the present invention, the other components being substantially as illustrated in FIG. 2.

FIGS. 4 and 5 illustrate one embodiment of a centrifugal cleaner 22 according to the present invention. The cleaner 22 has the same basic components as the cleaner 10 of the prior art, including a generally hollow main body 23 having a top 24 and a bottom 25 (see FIG. 5) and a side wall 26 with at least a portion thereof having a generally decreasing conical taper from the top 24 to the bottom 25, and a tangential inlet 27 in the side wall near the top 24 for introducing fiber suspension to be cleaned. A vortex finder 28 is located in the body top 24 and extends into the hollow interior 29 of the body, and a bottom outlet nozzle 30 (see FIG. 5) is provided at the bottom 25 of the body 23 substantially concentric with the vortex finder 28. "Accepts ", that is cleaned pulp, pass out of the hollow interior 29 through the vortex finder 28, while the "rejects", that is separated ink or other particles that are undesirable in the pulp, pass out of the hollow interior 29 through the bottom outlet nozzle 30.

According to the present invention the cleaner 22 has a turbulence generator disposed in the tangential inlet 27. In the exemplary embodiment illustrated in FIGS. 1 and 5, the turbulence generator comprises an abrupt cross-sectional area reduction portion in the tangential inlet 25. That is the tangential inlet 27 has a first interior cross-sectional area portion 32 and a second portion 33, the cross-sectional area of the portion 33 being about 0.1–0.3 times as large as the cross-sectional area of the inlet first portion 32. Typically, although not necessarily, the cross-sectional configuration of each of the portions 32, 33 is circular, in which case the diameter of the portion 33 is about 0.35–0.55 (preferably about 0.4–0.5, e.g. about 0.46) times as large as the diameter of the portion 32. In the embodiment illustrated in FIGS. 4 and 5 the abrupt cross-sectional area reduction is defined by a wall 34 which is essentially perpendicular to the direction 35 of flow of fiber suspension fed to the tangential inlet 27.

The turbulence generator disposed in the tangential inlet 27 preferably generates sufficient turbulence so as to break up fiber flocs and introduce suspension and prevent reformation of the flocs before the suspension enters the hollow interior 29 of the main body. This enhances cleaning efficiency of the cleaner 22, increases the consistency of fiber suspension which the cleaner can effectively handle (that is and obtain a minimum threshold of cleaning efficiency), and/or minimizes the sensitivity of the cleaner 22 to consistency changes in the fiber suspension. For example utilizing the cleaner 22 of FIGS. 4 and 5 suspensions with a consistency of about 1% can be handled with approximately the same cleaning efficiency as suspensions of 0.5% consistency utilizing a prior art cleaner such as those of FIGS. 2 and 3, or the efficiency of the cleaner 22 is increased for a given consistency.

Figure 6:
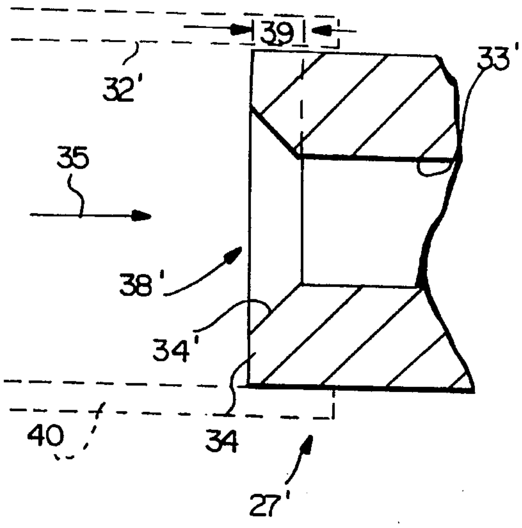
FIG. 6 is an alternative configuration that the turbulence generator portion of the cleaner of FIG. 4 could have.
Figure 7:
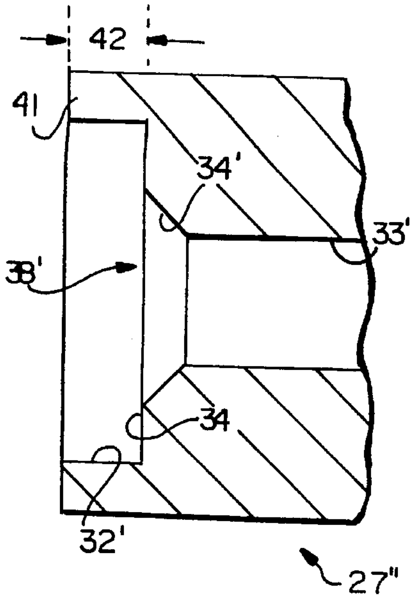
FIG. 7 is a view like that of FIG. 6 of yet another alternative configuration that the turbulence generator of the cleaner of FIG. 4 could have.

Other configurations that the abrupt cross-sectional area reduction—shown generally by reference numeral 38 in FIGS. 4 and 5—can have are illustrated in FIGS. 6 and 7. In FIG. 6, the inlet nozzle 27' includes an abrupt cross-sectional area reduction portion 38' formed by a rounded or—as illustrated—chamfered wall portion 34' between the different diameter portions 32', 33'. The angle that the chamfer 34' makes with the flow direction 35 is large, typically over 45°, and it extends only a short distance 39 in the flow direction 35, so that an abrupt reduction is provided. Also, the tangential inlet 27' is illustrated in FIG. 6 need not necessarily be part of the cleaner 22, but it may be connected to the cleaner utilizes conduits, such as shown in U.S. Pat. No. 3,959,150. In that case the inlet conduit connecting the cleaner to piping brings the fiber suspension to the cleaner and forms an inlet 27'. The exterior pipe for this purpose is shown in dotted line by reference numeral 40 in FIG. 6, and it has an internal diameter 32'.

FIG. 7 illustrates a tangential inlet 27" comparable to that shown in FIG. 6 only instead of the exterior piping 40 having the first diameter 32', an integral segment 41 having a length 42 in the dimension 35 is provided.

While the abrupt cross-sectional area reduction portion 38, 38', etc. as seen in FIGS. 4 through 7 is typically the easiest to manufacture, other turbulence generators having much different configurations for generating the turbulence, can also be provided. Three other exemplary embodiments of turbulence generators are illustrated in FIGS. 8 through 10. In each of these cases the same reference numerals as in FIGS. 4 and 5 are provided to show the rest of the components of the cleaners, only the turbulence generators having different reference numerals and being described separately.

In the FIG. 8 embodiment while there is a diameter reduction between the exterior conduit 44 leading to the tangential inlet 27 and the tangential inlet 27, is defined by wall 45, the inside diameter/cross-sectional area of the inner passageway 46 is much greater than for the passageway 33, 33' in the FIGS. 4 through 7 embodiments, therefore while some turbulence is introduced by the reduction in diameter, the turbulence introduced is not typically sufficient to break up fiber flocs and prevent reformation.

FIG. 9 shows a zig-zag construction of the passage in the inlet 27, substantially parallel wall sections 50, 51 which are at an angle to the direction 47 being provided. The zig-zag configuration of the sections 50, 51 define a tortious flow path, as indicated by the arrows in FIG. 9.

FIG. 10 shows a tangential inlet 27 that—like the FIG. 8 embodiment—includes surface manifestations. In the case of FIG. 10 the surface manifestations comprise a continuous spiral rib 53 having a height of about 15–25% of the diameter of the internal passageway 54. Instead of a continuous spiral rib, a plurality of circumferential ribs, spaced in the direction of flow 47, or a discontinuous spiral rib, may be provided.

The cleaner of the present invention has been studied in a laboratory by running extensive tests comparing the different embodiments of the invention with each other and with prior art cleaners. The experiments were performed on a pilot scale in a Research Laboratory. The laboratory includes a flexible multi-purpose stock preparation and recycling system. It operates in discrete batch mode. A general overview of the laboratory system and its capabilities is contained in FIG. 11 showing, however, only key parts of the laboratory machinery that were in use during the experiments.

The tests used commercially procured sorted recycled while ledger paper as furnish. The laser-printed portion of the furnish was approximately 50–60%. The contaminant concentration (stickies, plastics, styrofoam, etc.) was generally low, but was also observed to be quite variable from pulper to pulper batch. The research project consisted of a series of pilot runs. The reason for choosing as furnish the laser printed white ledger was the fact that laser ink particles are quite difficult to separate so that the differences between different types and embodiments of the cleaners can be very clearly seen. Also it is easy to analyze the separation efficiency since the black laser ink particles are clearly visible both before and after the separation process.

Furnish for each experiment was repulped in 170 Lb (77 kg) AD batches in a four-foot (1.2-m) diameter pulper 56. Stock was repulped at 150° F. (65°C.) for 45 minutes, at a 6% consistency target. The pH was adjusted to 11.0 with sodium hydroxide by adding the chemical to the pulper 56. A dose of 15 Lbs/Ton (0.75% by weight) of conventional laser deinking chemical, namely commercially available #CDI-225 from Betz, was added at the beginning of the pulping cycle in the pulper 40. The deinking chemical is considered to have no effect on the comparative nature of the actual results.

The stock was then dumped to an agitated stainless steel tank 57 having an agitator 58. It was diluted to the desired feed consistency for the cleaner 59 with cold fresh water. Cleaner operation was stabilized; composite samples (S) were then drawn from the feed (F), accepts (A), and rejects (R) for a given condition. Three gram Noble and Wood handsheets were formed to evaluate the ink removal efficiency; consistencies, flow rates, and reject rates were determined. The handsheets were analyzed for dirt count and particle size distribution on an Image Analyzer (IA) 60. Device 60 is a document scanner based instrument with a minimum particle size class resolution of 160 microns diameter (0.02 sq. mm). A computer analyzes the dirt particle size distribution over the entire handsheet surface. Multiple handsheets were made and measured for each condition. This reduced variation due to sampling, instead of replying on the analysis of a single handsheet. Cleaner performance was evaluated by the percent reduction of total dirt area (ppm) from the feed to the accepts.

Figure 12:
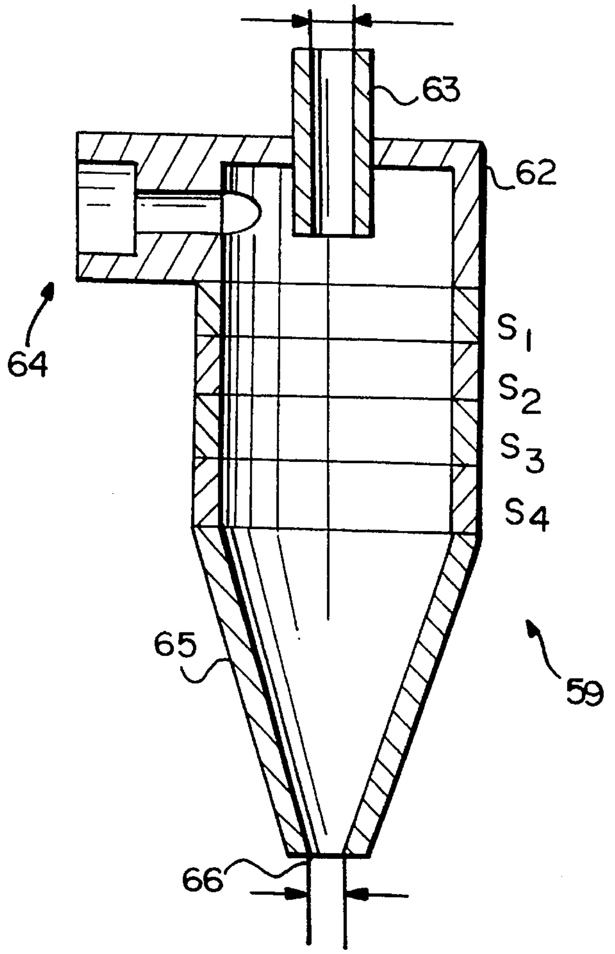
FIG. 12 is a side cross-sectional schematic illustration of an exemplary cleaner according to the present invention with removable body sections for testing various configurations according to the invention.

The cleaner 59 used in the tests is shown in detail in FIG. 12. The test cleaner 59 comprises a changeable top portion 62 with a central axial accept outlet/vortex finder 63, and a tangential inlet 64. The top portion 62 is of cylindrical cross-section. Below the top portion 62 the cleaner has four cylindrical segments $S_1$–$S_4$ for adjusting the length of the cylindrical body section. Below the removable cylindrical segments $S_1$–$S_4$ there is a standard 3° taper conical portion 65, having at its bottom an axial reject outlet 66. Also the conical portion 65 of the cleaner was changeable. The diameter of the accept outlet is designated by $D_A$, the diameter of the reject outlet or orifice $D_R$, and the diameters of the feed inlet by $D_{11}$ and $D_{12}$ in FIG. 12.

Since the purpose of the experiments was to provide not only higher consistency operation, but also to improve the overall separation efficiency of the centrifugal cleaner 59, a variety of tests were run. As the cleaner 59 was of such construction that all the functionable members could be changed the following evaluations were made:

1. Effect of the cleaner head structure 62 on separation efficiency.
2. Effect of rejection orifice diameter $D_R$, pressure drop, and feed consistency on removal efficiency using a standard cleaner cone 65.
3. Effect of cleaner cone 65 design modifications on single pass ink removal efficiency.
4. Effect of the elimination of the cylindrical portions $S_1$–$S_4$ of the cleaner 59 on the separation efficiency.
5. Effect of two experimental cleaner cone designs on separation efficiency compared to the performance of a commercial prior art cleaner.

Example 1

Figure 13:
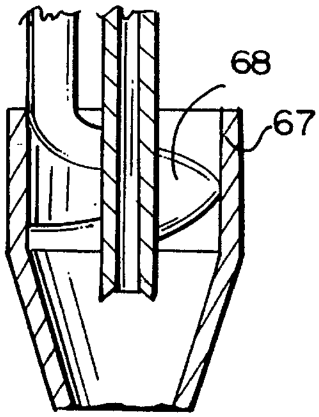
FIG. 13 (PRIOR ART)
FIG. 13 is a longitudinal cross-sectional view, partly in elevation, of a prior art annulus head type of centrifugal cleaner (which was tested against exemplary cleaners according to the present invention)

The first trial evaluated four different head designs attached above segment 8, with segments $S_2$–$S_4$ removed. Two of the four head designs are illustrated in FIGS. 12 and 13. FIG. 12 shows the centrifugal cleaner with a "turbulence head" according to the invention, i.e. including the feed inlet shown in FIGS. 4 and 5. FIG. 13 illustrates a conventional "annulus head" cleaner where the feed of the material is parallel with the axis of the cleaner and where the cleaner head 67 turns the axial flow to a spiral flow path by means of a spiral channel 68 in the cleaner head 67. The other head forms are designated as standard head—as seen in FIG. 3—and velocity head—as seen in FIG. 2. The standard head—FIG. 3—has a cylindrical feed inlet with no change in the diameter. The velocity head—FIG. 2—has a head with the diameter of the feed inlet gradually deceasing towards the cleaner body, increasing the flow speed of the material entering the cleaner.

Figure 15:
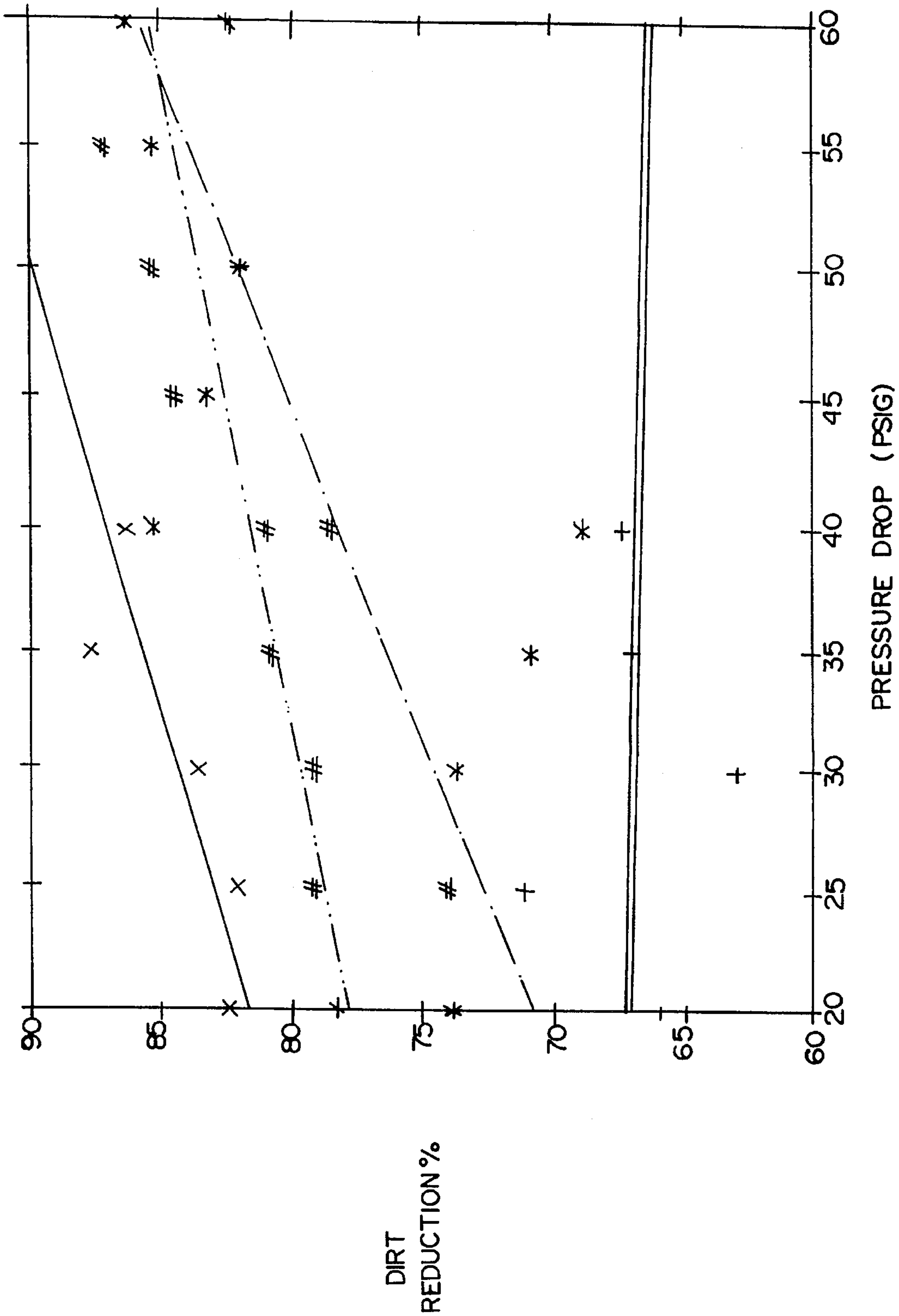
FIG. 15 is a graphical representation showing the relationship between cleaning efficiency and pressure drop for a number of different cleaner head configurations of the prior art and the present invention.

Five to ten pressure drops were run for each combination. Single pass removal efficiency average 84% over the 20–40 psig (137–275 kPa) pressure drop range with the turbulent head cleaning 1.07% consistency feed stock. Summary results from the effect of head design are contained in FIG. 15. The data presented was all obtained with a single body section $S_1$. "*" indicates the standard head cleaner, "#" the velocity head, "+" the annulus head, and "x" the turbulence head cleaner of the invention. The turbulence head cleaner of the invention (FIGS. 12, 4 and 5) gave better removal efficiency at lower pressure drops than either the standard or velocity heads. The annulus head gave poor performance.

EXAMPLE 2

The next pilot trial evaluated the effects of reject orifice diameter $D_R$, pressure drop, and feed consistency on single pass treated laser ink removal efficiency using a standard RB-80D Ahlstrom cleaner cone. The cone was of polyurethane modular construction. This data provided a baseline with which to make the experimental comparisons with the different embodiment sin accordance with the invention.

Figure 16:
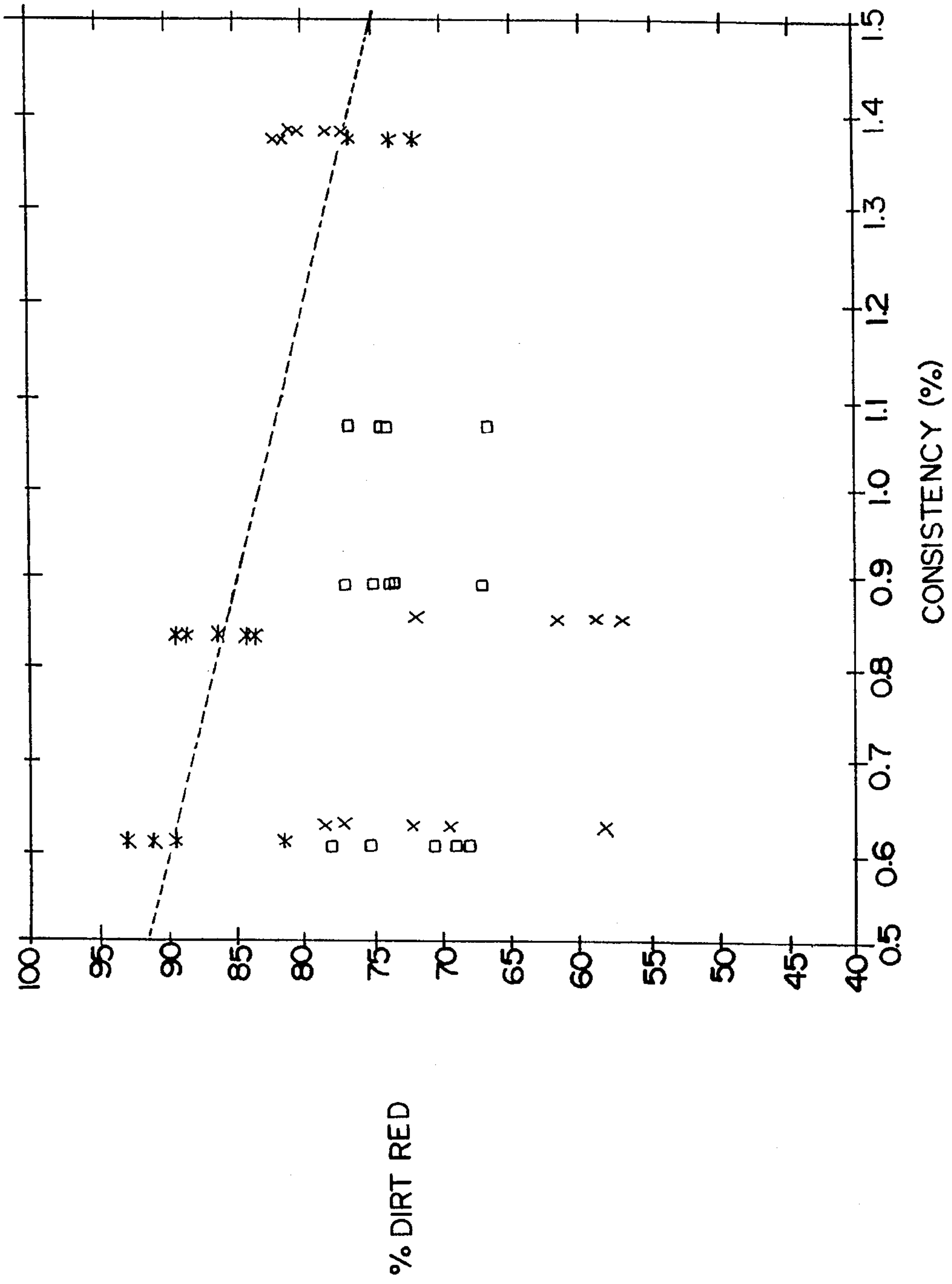
FIG. 16 is a graphical representation of the relationship between cleaner efficiency and pulp consistency for a number of different reject outlet diameters of cleaners.
Figure 17:
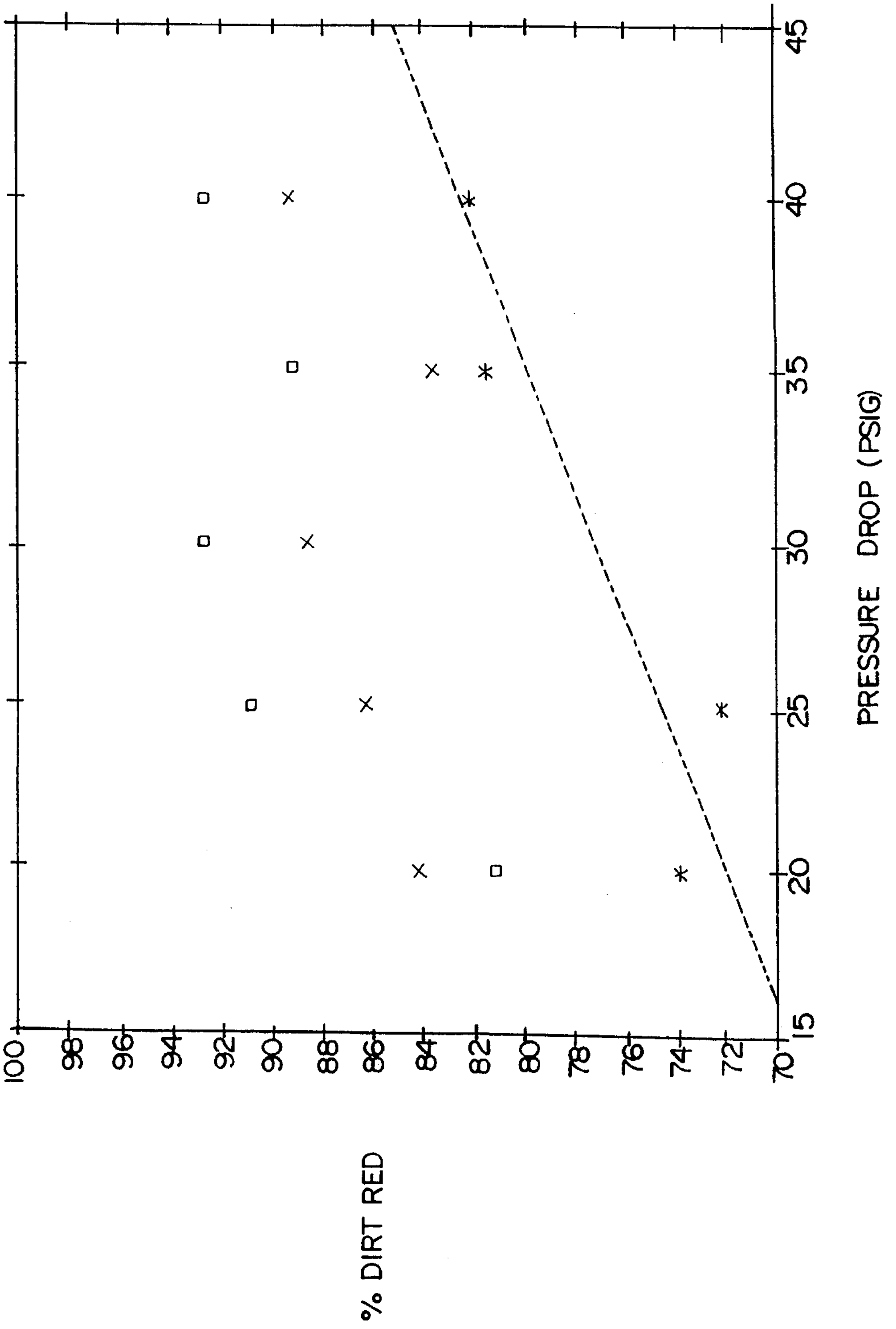
FIG. 17 is a graphical representation of the cleaning efficiency versus pressure drop for a number of different pulp feed consistencies.

Five different pressure drops were run at three different target feed. consistencies, using three reject tip or orifice diameter $D_R$. An orifice diameter of 0.375 inches (9.5 ram) and a 40 psig (275 kPa) pressure drop gave the best overall performance. Single pass laser ink removal efficiency was 82% at a feed consistency of 1.37%. Reject rate by weight with the 0.375 in (9.5 ram) tip ranged from 15–20% by weight. The standard cone performance decreased significantly with increasing feed consistency. Higher pressure drops produced higher removal efficiencies. Results are presented in FIGS. 16 and 17. In FIG. 16, "*" indicates the results for a 0.375 inch reject orifice, "x" for a 0.500 inch rejects orifice, and "o" a 0.625 inch reject orifice. In FIG. 17, "*" is a feed consistency of 1.37%, "x" a feed consistency of 0.83%, and "o" a feed consistency of 0.51%.

EXAMPLE 3

The third trial examined the effect of cleaner cone design modifications on single pass ink removal efficiency. The trial evaluated four different cone body lengths, and two reject tip diameters. The head was a standard head (FIG. 3) the inlet having a constant diameter over its entire length with no turbulence creating means.

The effect of retention time within the cleaner was evaluated by varying the length of the cylindrical portion of the body from 1 to 4 modular segments $S_1$–$S_4$. Each segment $S_1$–$S_4$ was 10 inches (25 cm) long. The conical portion of the cleaner remained constant. Reject tips of 0.25 in. (6.4 ram) and 0.375 in. (9.5 mm) diameter $D_R$ were used. Five to ten pressure drops were run for each combination. The 0.375 inch (9.5 mm) diameter tip was confirmed as generally having the best performance.

Figure 18:
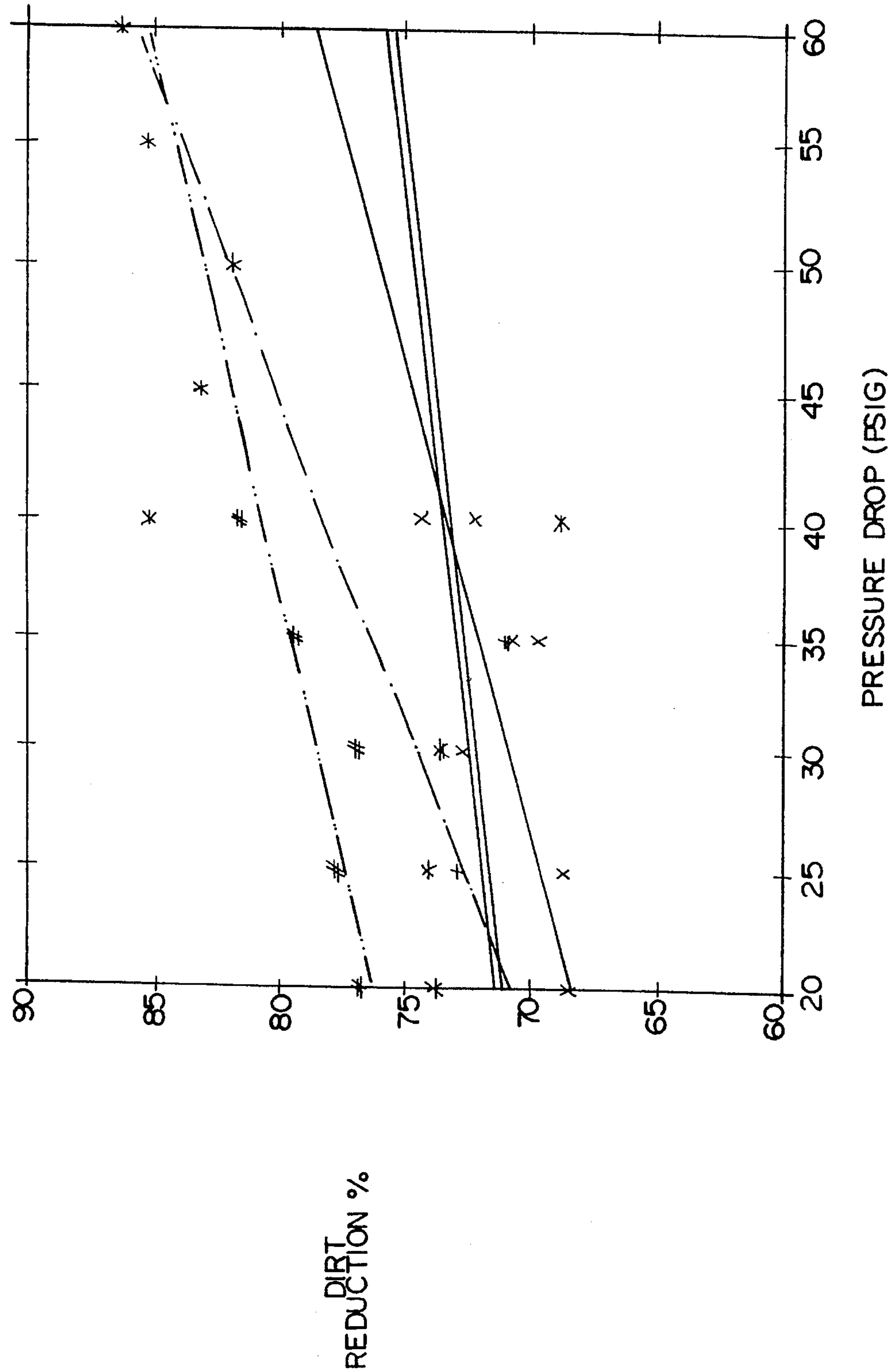
FIG. 18 is a graphical representation of cleaner efficiency versus pressure drop for a number of different cleaner body configurations.

Performance with one or two body sections while using the standard head of FIG. 3 was superior to performance with three or four body sections $S_1$–$S_4$. The effect of increased retention time within the cone was overshadowed by the loss of a cohesive vortex within the increased cone length. Summary results from the effect of body length are contained in FIG. 18. In FIG. 18, "*" indicated one body section, "#" two body sections, "x" three body sections, and "+" four body sections. This work was successfully replicated at a later date using a bale of sorted white ledger from a different source. A single body section $S_1$ was chosen as having the best performance.

EXAMPLE 4

Since reduction of the cleaner body length had improved performance an experiment was planned where the cylindrical portion of the cleaner cone was completely eliminated. In other words, the cleaner 70 only included the conical body portion 71 and the inlet 721 and the two outlets 73, 74 (that is no segments $S_1$–$S_4$); see FIG. 14. In addition, an extended vortex finder tube 75 was inserted in the accepts opening. The cleaner 70 was operated at a feed consistency target of 1.25% at a 30 psig pressure drop. Duplicate samples were obtained and analyzed. These two changes—the increased length vortex finder 75, and the non-cylindrical body portion (only cone 71)—increased dirt removal efficiency from 86 to 93% for a single pass.

EXAMPLE 5

The next step was to produce feed consistency versus ink removal efficiency curves for both experimental cleaner cone designs. Feed consistency was varied from 1.50% to 0.50% in 0.25 % increments for the single body section $S_1$ (FIG. 12) cone. Samples were also obtained for the no body section cone (FIG. 14) at 0.5% and 1.25% feed consistency targets. Duplicate samples were obtained and processed for each step.

Figure 19:
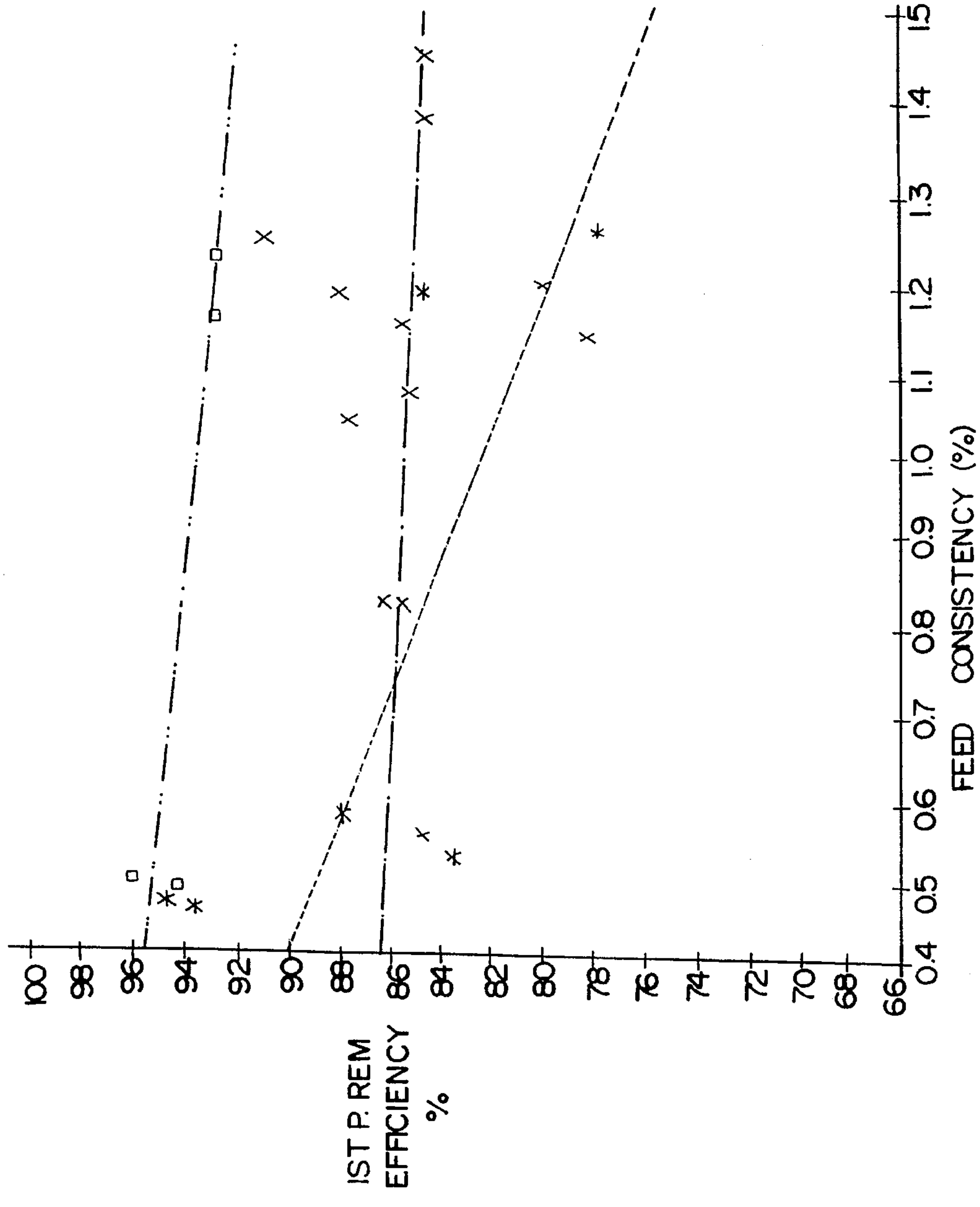
FIG. 19 is a graphical representation showing first pass cleaning efficiency plotted against feed pulp consistency for three different types of centrifugal cleaners.

Single pass ink removal efficiency remained nearly constant at 86% across the entire consistency range for the single body section (FIG. 12 with only segment $S_1$). [This flat-line response is illustrated in FIG. 19.] Single pass removal efficiency averaged 95% for the no body section cone (FIG. 14) at 0.5% consistency. The removal efficiency average 93% at a teed consistency of 1.20%.

Another step of the pilot study was to provide single pass removal efficiency comparisons to a commercially available cleaner cone. A three inch diameter centrifugal cleaner cone was chosen which gave good removal efficiencies at low feed consistency. The cone was operated at six feed consistencies varying from 0.4 to 1.3% pressure drop remained constant at 30 psig (210 kPa). These data points are displayed in FIG. 1 and referred to above. The mean removal efficiency for this cone was 90% at 0.45% feed consistency, but dropped to 78% at 1.3% feed consistency.

The curve of FIG. 1 is overlaid on the consistency versus removal efficiency curve in FIG. 19 for the experimental cone shown in FIG. 12. [In FIG. 19 "x" indicates the experimental cone with 1 body section, "*" a commercial three inch cone, and "o" the experimental cone with no body sections.] At consistencies above 0.75%, the experimental cone with one body section $S_1$ out-performed the commercial cone. At 1.3% feed consistency, the experimental cone gave 8% high removal efficiency (78 vs. 86% single pass) than the standard cone. The no body section cone (FIG. 14) out-performed the commercial cone at both low (95% vs. 90%) and high ( 93% vs. 78%) consistency. The upper limit for operating the experimental cleaner at the highest possible efficiency appears to be somewhere between 1.25 and 1.5% feed consistency.

Figure 20:
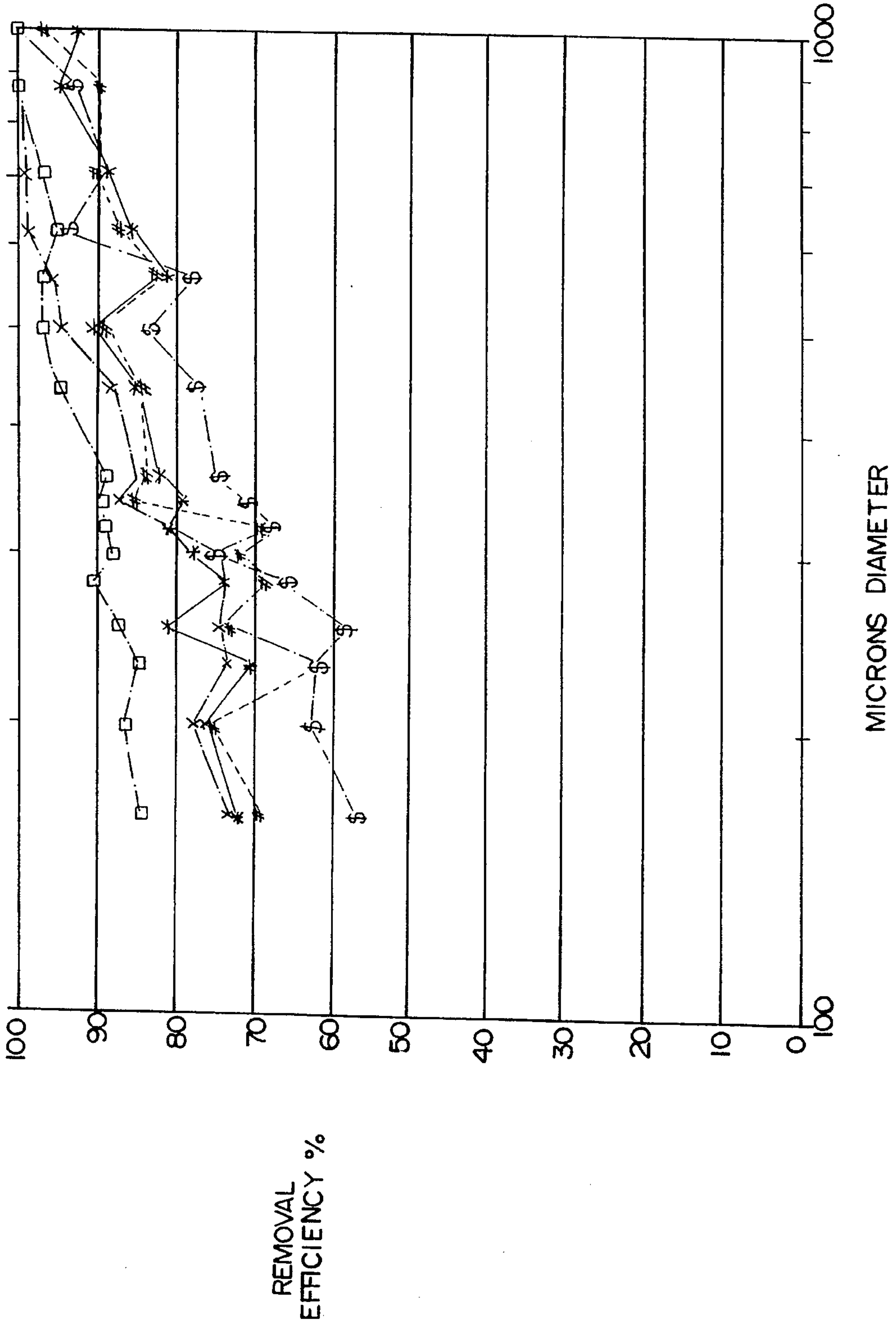
FIG. 20 is a graphical representation showing the relationship between cleaning efficiency and size of removed particles for a number of different centrifugal cleaner body constructions.

Also, an analysis of the removal efficiency by particle size class was made. This analysis is illustrated graphically in FIG. 20. The analysis showed particle removal efficiency remaining relatively constant across the entire size range, up to a feed consistency of 1.25%. Removal of the smaller particles started to suffer at a feed consistently of 1.5%. Particle removal efficiency by size class was also clearly higher for the no body section cone (FIG. 14) at both low and high consistency. In FIG. 20, "*" indicates 0.5% consistency, one body section; "#" 1.25%, one section; "$" 1.5%, one section; "o" 0.5%. zero section and "x" 1.25%, zero sections.

In accordance with the above described studies a centrifugal cleaner was designed. Though the studies were made considering ink removal the results thereof may be applied on a much broader scale. Also, in spite of the fact that the operation of a cleaner cone of only a single size was studied the results of the studies may be applied to a broad range of cleaner. Therefore, the following relative dimensions of an optimized cleaner cone may be applied in constructing cleaners for various different applications.

The test showed that the diameter of the reject outlet $D_R$ should be of the order 1.1–1.2 times the inlet diameter $D_{12}$. If a turbulence head is used the following relation should apply $D_R=(1.1-1.2)*D_{12}$.

Since the length of the cone was found to have a significant effect on the separation efficiency it was concluded the residence time should be of the order of 0.3–1.5 seconds (e.g. between 0.3–1.0 seconds, preferably less than five seconds for a three inch cleaner). This naturally depends somewhat on the size of the cleaner whereby the bigger the cleaner is the longer the residence time could be without endangering the operation of the cleaner.

Optimization of the vortex finder length and diameter will be described with respect to FIG. 14. In FIG. 14 the internal diameter of the hollow body of the cleaner 70 surrounding the vortex finder 75 is indicated by reference numeral 78, while the internal diameter 79 of the vortex finder is substantially concentric with the diameter 78. The diameter 79 is optimally about 0.25–0.4 times the diameter 78, preferably about 0.3–0.35 times.

The length to diameter ratio for the vortex finder 75 is also significant Optimum performance occurs when the length 80 from the top 81 of the cleaner 70 to the bottom of the vortex finder 75 (assuming the cleaner 70 is vertical, although it could have other orientations) is about 2.5–3.5 times the diameter 79, preferably about 2.5–3.1 times.

As described above, the optimum performance for the FIGS. 4 and 5 embodiment of the invention is achieved when the diameter 33 is about 0.30–0.55 times as large as the diameter 32, preferably about 0.4–0.5 times as large. For example if the diameter 33 is 0.75 inches and the diameter 32 is 1.625 inches just about optimum cleaning efficiency is achieved (0.75/1.625=0.4615).

It should also be understood that the accept pipe such as the pipe 75 according to the invention should have a thin wall, normally the thinner the better. If the vortex finder 75 is made out of plastic material, the thickness of the wall must be at least 5 mm in order to have sufficient strength. However failure could be expected in about one to two years if it was so constructed. Therefore it is more desirable to utilize stainless steel for the vortex finder 75, typically have about a 2 mm wall thickness. The diameter 79 (internal diameter) is preferably about 26 mm. With this diameter, a 75 mm length (the dimension 80) is about optimum, the length to diameter ratio being about 2.9/1 whereas for a standard cleaner the length to diameter ratio is about 1.9/1.

The invention is not merely applicable to the construction of new centrifugal cleaners, but also according to the invention existing cleaners may be retrofit. This is illustrated schematically in FIG. 21 where a standard cleaner shown generally by reference numeral 84 is modified according to the present invention. The tangential inlet 85 of the cleaner 84 has an internal diameter 86 and an interior hollow open portion 87 of the body of the cleaner 84. An insert 88 is provided having an external diameter 89 essentially equal to the internal diameter 86 of the tangential inlet 85 (or slightly less than it). The internal diameter 90 is preferably about 0.35–0.55 times as large as the diameter 86. The insert 88 also has a length less than the length of the tangential inlet 85 in the direction 91.

Figure 21:
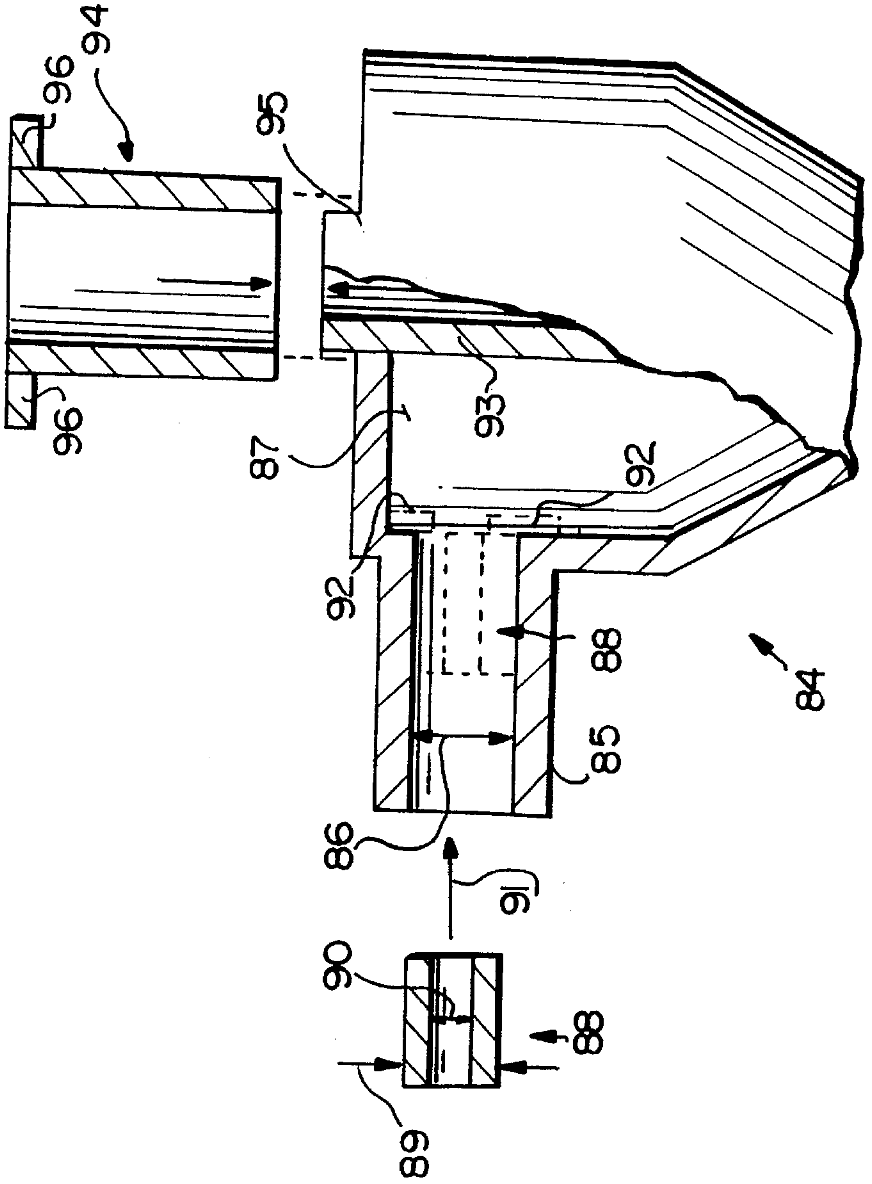
FIG. 21 is a side cross-sectional schematic view, partly in elevation, illustrating the manner in which a conventional centrifugal cleaner can be modified to provide a cleaner having the advantages of the cleaners of the present invention.

According to the present invention the insert 88 is inserted into the tangential inlet 85, positioned as illustrated at dotted line in FIG. 21, so that an abrupt cross-sectional decrease is provided in the pathway of fiber suspension flowing into the inlet 85 to the interior 87 in the direction 91. The insert 88 may be maintained in place as indicated at dotted line in FIG. 1 either by an adhesive on the exterior thereof, or if the internal diameter 85 tapers by providing a tapering exterior surface of the inlet 88. Alternatively it may have a friction fit, or one or more stop plates 92 may be positioned in the interior 87 abutting the insert 88.

Also a vortex finder as according to the present invention may also be retrofit. For example the conventional vortex finder 93 of the cleaner 84 may be replaced with a vortex finder 94 as according to the present invention, which has a longer length (from the top into the chamber 87), and the more desirable internal diameter to length ratio. This may be accomplished by drilling, cutting, or otherwise severing the top support portion 95 for the conventional vortex finder 93, and then inserting the vortex finder 94 according to the invention and fixing it in place, e.g. by welding, by screwing bolts through the ears 96, etc. The internal diameter of the vortex finder 94 is about 0.3–0.5 times the internal diameter of the chamber 87 surrounding the vortex finder 94 once it is in place, while the length to diameter ratio of the vortex finder 94 is about 2.5–3.1/1.

By performing a retrofit as illustrated in FIG. 1 substantially superior results can be obtained for a conventional cleaner 84. An actual test illustrated by the following example indicates these superior results:

EXAMPLE 6
DATA SUMMARY

| Sample | CONS. % | FLOW (GPM) | PRESS. (PSIG) | RR % w | RR % v | TF % | TOTAL SPECK (#/SQ.M) | TAPPI DIRT (ppm) |
|---|---|---|---|---|---|---|---|---|
| Beloit Posi-Flow | | | | | | | | |
| Feed | 1.020 | 71 | 35 | | | | 6854 | 1908.2 |
| Accepts | 0.967 | — | 5 | | | | 2618 | 298.7 |
| Rejects | 2.220 | 3.62 | | 11.1% | 5.1% | 2.2% | | |
| % Reduct. | | | | | | | 61.8% | 84.3% |
| Beloit Posi-Flow with Turbulence Head of the Invention | | | | | | | | |
| Feed | 1.010 | 44 | 35 | | | | 7184 | 1967.4 |
| Accepts | 0.966 | — | 5 | | | | 1541 | 62.3 |
| Rejects | 2.150 | 3.40 | | 16.3% | 7.4% | 2.1% | | |
| % Reduct. | | | | | | | 78.5% | 96.8% |

It will thus be seen that according to the present invention an advantageous centrifugal cleaner, and method of retrofitting existing cleaners, have been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and processes.

What is claimed is:

1. A centrifugal cleaner for fiber suspensions having fiber flocs therein, comprising:

a generally hollow main body having a top and a bottom and a side wall having at least a portion thereof with a generally decreasing conical taper from the top toward the bottom thereof, and having a tangential inlet in said side wall near said body top for introducing fiber suspension to be cleaned;

a vortex finder located in said body top;

a bottom outlet nozzle located at said bottom of said main body, substantially concentric with said vortex finder; and a turbulence generator disposed in said tangential inlet for generating sufficient turbulence so as to break up fiber flocs in introduced suspension and prevent reformation of the flocs before the suspension enters said hollow main body, so as to enhance cleaning efficiency of the cleaner, increase the consistency of fiber suspension which the cleaner can effectively handle, and/or minimize the sensitivity of the cleaner cleaning efficiency to consistency changes in the fiber suspension compared to the same cleaner but not including said turbulence generator.

2. A cleaner as recited in claim 1 wherein said turbulence generator comprises an abrupt cross-sectional area reduction portion in said tangential inlet.

3. A cleaner as recited in claim 2 wherein said inlet is substantially circular in cross-section having a first diameter, and said turbulence generator reduced cross-sectional area portion has a second diameter which is about 0.35–0.55 times as large as said first diameter.

4. A cleaner as recited in claim 2 wherein said turbulence generator portion has a cross-sectional area about 0.1–0.3 times as large as the cross-sectional area of said inlet.

5. A cleaner as recited in claim 2 wherein said turbulence generator comprises an insert having an exterior cross-sectional area and configuration substantially the same as the cross-sectional area and configuration of said tangential inlet.

6. A cleaner as recited in claim 1 wherein said vortex finder has a first diameter and said hollow body has a second diameter at a portion thereof surrounding said vortex finder; and wherein said first diameter is about 0.25–0.4 times said second diameter.

7. A cleaner as recited in claim 6 wherein said vortex finder extends into said hollow body a first length from said top, and wherein said first length to first diameter ratio is about 2.5–3.5/1.

8. A cleaner as recited in claim 7 wherein said first diameter is about 0.3–0.35 times said second diameter, and said first length to first diameter ratio is about 2.5–3.1/1.

9. A cleaner as recited in claim 1 wherein said turbulence generator comprises a plurality of surface manifestations in said inlet causing a fluctuating cross-sectional area within said inlet from near the beginning of said inlet to said hollow main body through which the fibrous suspension must flow in passing through said inlet.

10. A cleaner as recited in claim 1 wherein said turbulence generator comprises a plurality of annular grooves in said inlet, which grooves are polygonal in cross-section.

11. A cleaner as recited in claim 1 wherein said inlet is circular in cross-section having a diameter, and wherein said turbulence generator comprises a spiral rib formed in said inlet and having a height of about 15–25% of the diameter of said inlet.

12. A cleaner as recited in claim 1 wherein said turbulence generator comprises a zig-zag, back-and-forth, tortuous flow path in said inlet through which the fibrous suspension must flow in passing through said inlet.

13. A cleaner as recited in claim 1 wherein said side wall from said tangential inlet toward said bottom is substantially completely defined by said conically tapered portion, and wherein said conically tapered portion has an angle of taper of about 2–6 degrees.

14. A cleaner as recited in claim 1 wherein the dimensions of said hollow body, side wall, top, and bottom are selected so that the mean residence time of fibrous suspension in said cleaner is proportional to less than 0.5 seconds for a three inch cleaner.

15. A centrifugal cleaner for fiber suspensions having fiber flocs therein, comprising:

a generally hollow main body having a top and a bottom and a side wall having at least a portion thereof with a generally decreasing conical taper from the top toward the bottom thereof, and having a tangential inlet in said side wall near said body top for introducing fiber suspension to be cleaned;

a vortex finder located in said body top;

a bottom outlet nozzle located at said bottom of said main body, substantially concentric with said vortex finder;

wherein said vortex finder has a first diameter and said hollow body has a second diameter at a portion thereof surrounding said vortex finder; and wherein said first diameter is about 0.25–0.4 times said second diameter.

16. A cleaner as recited in claim 15 wherein said vortex finder extends into said hollow body a first length from said top, and wherein said first length to first diameter ratio is about 2.5–3.5/1.

17. A cleaner as recited in claim 16 wherein said first diameter is about 0.3–0.35 times said second diameter, and said first length to first diameter ratio is about 2.5–3.1/1.

18. A centrifugal cleaner for fiber suspensions having fiber flocs therein, comprising:

a generally hollow main body having a top and a bottom and a side wall having at least a portion thereof with a generally decreasing conical taper from the top toward the bottom thereof, and having a tangential inlet in said side wall near said body top for introducing fiber suspension to be cleaned;

a vortex finder located in said body top;

a bottom outlet nozzle located at said bottom of said main body, substantially concentric with said vortex finder; and a turbulence generator comprising an abrupt cross-sectional area reduction portion in said tangential inlet, said turbulence generator having a cross-sectional area about 0.1–0.3 as large as the cross-sectional area of said inlet.

19. A cleaner as recited in claim 18 wherein said vortex finder has a first diameter and said hollow body has a second diameter at a portion thereof surrounding said vortex finder; and wherein said first diameter is about 0.25–0.4 times said second diameter.

20. A cleaner as recited in claim 19 wherein said vortex finder extends into said hollow body a first length from said top, and wherein said first length to first diameter ratio is about 2.5–3.5/1.

21. A cleaner as recited in claim 18 wherein the turbulence generator reduced cross-sectional area portion has a second diameter which is about 0.4–0.5 times as large said first diameter.

22. A centrifugal cleaner for fiber suspensions having fiber flocs therein, comprising:

a generally hollow main body having a top and a bottom and a side wall having at least a portion thereof with a generally decreasing conical taper from the top toward the bottom thereof, and having a tangential inlet in said side wall near said body top for introducing fiber suspension to be cleaned;

a vortex finder located in said body top;

a bottom outlet nozzle located at said bottom of said main body, substantially concentric with said vortex finder; and a turbulence generator disposed in said tangential inlet, said turbulence generator defining zig-zag, back-and-forth, tortuous flow path in said inlet through the fibrous suspension must flow in passing through said inlet.

23. A centrifugal cleaner for fiber suspensions having fiber flocs therein, comprising:

a generally hollow main body having a top and a bottom and a side wall having at least a portion thereof with a generally decreasing conical taper from the top toward the bottom thereof, and having a tangential inlet in said side wall near said body top for introducing fiber suspension to be cleaned;

a vortex finder located in said body top;

a bottom outlet nozzle located at said bottom of said main body, substantially concentric with said vortex finder; and a turbulence generator disposed in said tangential inlet, said turbulence generator for breaking up fiber flocs and preventing reformation thereof, and comprising a plurality of surface manifestations in said inlet causing a fluctuating cross-sectional area within said inlet from near the beginning of said hollow main body through which the fibrous suspension must flow in passing through said inlet.

24. A cleaner as recited in claim 23 wherein said surface manifestations comprise a plurality of annular grooves which are polygonal in cross-section.

25. A cleaner as recited in claim 23 wherein said inlet is circular in cross-section having a diameter, and wherein said surface manifestations comprise a spiral rib having a height of about 15–25% of the diameter of said inlet.

26. A cleaner as recited in claim 23 wherein said vortex finder has a first diameter and said hollow body has a second diameter at a portion thereof surrounding said vortex finder; and wherein said first diameter is about 0.25–0.4 times said second diameter.

* * * * *